United States Patent [19]

Petrof et al.

[11] Patent Number: 4,802,274

[45] Date of Patent: Feb. 7, 1989

[54] METHOD OF DETERMINING WORN ROTARY TOOL

[75] Inventors: Robert C. Petrof, Farmington Hills; Charles O. McHugh, Dearborn Heights, both of Mich.

[73] Assignee: Ford Motor Company, Dearborn, Mich.

[21] Appl. No.: 46,066

[22] Filed: May 4, 1987

[51] Int. Cl.$^4$ ................. B23Q 3/156; B23B 49/00
[52] U.S. Cl. ................................. 29/568; 340/680; 408/11; 409/132
[58] Field of Search .............. 29/568; 408/11, 6, 9; 340/680, 679; 364/474; 409/134, 131, 132, 187, 194

[56] References Cited

U.S. PATENT DOCUMENTS

| | | | |
|---|---|---|---|
| 3,208,311 | 9/1965 | Pierce | 408/11 |
| 4,260,986 | 4/1981 | Kobayashi et al. | 408/11 |
| 4,304,511 | 12/1981 | Machida | 408/11 |
| 4,442,494 | 4/1984 | Fromson et al. | 364/474 X |
| 4,507,025 | 3/1985 | Fedor | 408/9 X |
| 4,532,599 | 7/1985 | Smith | 408/11 |
| 4,551,808 | 11/1985 | Smith et al. | 364/474 |

FOREIGN PATENT DOCUMENTS

| | | | |
|---|---|---|---|
| 141472 | 11/1979 | Japan | 340/680 |
| 127648 | 8/1982 | Japan | 340/680 |

OTHER PUBLICATIONS

"Power Consumption—A Measure of Tool Performance", Beer, Soc. of Mfg. Engrs., Tech. Paper MR79-398, Dearborn, MI, 1979.

"Sensors for Batch Manufacturing of Metal Parts", Bloomquist, Proceedings of the Amer. Soc. for Metal International Conf. on High Productivity Machining, Materials and Processes, New Orleans, LA, May 7-9, 1985.

"Analytical Strategies for Automatic Tracking of Tool Wear", Colwell, Proc. of the 6th N. Amer. Mfg. Res. Conf., Gainesville, FL, Apr. 16-19, 1978, pp. 276-282.

"Optimization of Drill Life: Influence of Cutting Conditions on Tool Wear", Fabris and Prodder, Proc. of the 10th N. Amer. Res. Conf., Hamilton, Ontario, Canada, May 24-25, 1982, pp. 337-341.

*Primary Examiner*—William Briggs
*Attorney, Agent, or Firm*—Joseph W. Malleck; Roger L. May

[57] ABSTRACT

A method is disclosed of determining worn rotary tools during machining operations, comprising: (a) establishing the steady-state dominant tool force level required to (i) carry out a rotary machining operation at a given set of cutting conditions in the abrasive wear regime, (ii) using a known worn rotary tool with a given geometry, and (iii) using a workpiece of given material; (b) supporting another rotary tool of the same given geometry in a holder for being power driven for rotation, the holder having means to impart a signal in response to exceeding a predetermined force level calibrated to be just below the steady-state force level of the worn tool; and (c) while employing the support tool, initiating an automatic tool change in response to any signal imparted by the tool support.

12 Claims, 7 Drawing Sheets

Establish steady-state force level required to:
- Carry out a rotary machining operation at a given set of cutting conditions in the abrasive wear regime
- Using a worn rotary tool of given geometry
- Against a workpiece of a certain material Support another rotary tool of the same geometry in a holder for being rotary power driven.
The holder having means to impart a signal in response to exceeding a predetermined force level set just below said steady-state force level of the worn tool.

While employing said supported tool, initiate an automatic change in response to any signal imparted by said tool support.

METHOD OF DETERMINING WORN ROTARY TOOL

BACKGROUND OF THE INVENTION

1. Technical Field

This invention relates to the art of automatically changing machine tools and, more particularly, to method of determining when rotary tools are sufficiently worn to require changing.

2. Description of the Prior Art

A crucial aspect for future factory automation will involve development of systems for automatic tool changing to maximize productivity while maintaining high levels of product quality. An ideal tool monitoring system would activate a tool changer when the cutting force reached a level corresponding to the end of the useful life of the tool, but prior to any catastrophic failure of the tool.

Prior known attempts to achieve this goal have included the use of audible sound spectra, acoustic emission intensity, temperature and touch probes, power consumption, and vibrations. Each of these sensing criteria have failed to provide an adequate system because (i) descernible signals, responsive to wear, occur too close to impending breakage, (ii) require impractical sensing equipment, and (iii) fall far short of being consistently reliable.

In particular, Beer ("Power Consumption--A Measure of Tool Performance", Soc. of Mfg. Engrs., Technical Paper MR79-398, Dearborn, Mich., 1979), disclosed a system employing power consumption as an indicator of wear. It is difficult to isolate consumption due to wear only, and this requires complex accounting for power losses not due to chip formation or wear. Bloomquist ("Sensors for Batch Manufacturing of Metal Parts", Proceedings of the American Society for Metals International Conference on High Productivity Machining, Materials and Processes", New Orleans, La., May 7-9, 1985) discloses a vibration based method for detecting dull tools. Such method is undesirable because it required attachment of a complex accelerometer and could not detect significant vibrations until the tool was substantially close to breakage; the utility of this method is further reduced by the normal use of bushings in the tool holder which inherently muffle vibrations.

Two authors have investigated the sensing of force related parameters. Colwell ("Analytical Strategies for Automatic Tracking of Tool Wear", Proceedings of the Sixth North American Manufacturing Research Conference, Gainesville, Fla., Apr. 16-19, 1978, pp. 276-282) used a system of cummulative percent deviation of chip thickness and cutting forces to render a more informed signal of worn lathe tools. Such work did not investigate the difficulty of sensing worn rotary tools and failed to recognize the use of threshold force values set just below steady-state force levels of tools in the abrasive wear regime.

Fabris and Prodder ("Optimization of Drill Life"Influence of Cutting Conditions on Tool Wear", Proceedings of the Tenth North American Research Conference, Hamilton, Ontario, Canada, May 24-25, 1982, pp. 337-341) tracked the rate of change of thrust or torque and required complex interpretation which is not sufficiently responsive to consistently prevent tool failures. The author specifically taught to avoid direct use of force parameters.

SUMMARY OF THE INVENTION

A primary object of this invention is to provide a method for determining a worn tool condition in (i) a predominantly thrust responsive rotary cutting operation, i.e., drilling, or a predominantly torque responsive cutting operation, i.e., tapping or reaming; and (ii) to do so inexpensively and simply. A secondary object of this invention is to provide such a method, as above, which also is adaptable to multiple-spindle cutting operations.

To meet the above goals, a method of determining worn rotary tools during machining operations has been invented which comprises: (a) establishing the steady-state dominant tool force level required to (i) carry out a rotary machining operation at a given set of cutting conditions in the abrasive wear regime, (ii) using a known worn rotary tool with a given geometry, and (iii) using a workpiece of given material; (b) supporting another rotary tool of the same given geometry in a holder for being power driven for rotation, the holder having means to impart a signal in response to exceding a predetermined force level calibrated to be just below the steady-state tool force level established in step (a); and (c) while employing said mounted tool in a rotary machining operation, sensing any relative movement between said movable members of said holder to trigger the initiation of a tool change.

Preferably, the means to impart a signal comprises relatively movable members and resistance means for preventing relative movement between the members until the force level experienced by the machining operation exceeds the resistance of the means, said resistance means being calibrated to be overcome at a force level just below the steady-state force level of the worn tool.

In a drilling operation, the tool force for said level is thrust, which thrust is applied axially to the rotary tool. In a reaming or tapping operation, the tool force for the force level is torque.

Preferably, the rotary cutting conditions comprise a feed of about 15 inches per minute and speed of 2000-2200 rpm.

Preferably, the determination of a worn condition is based upon (a) excessive land wear beyond that which can be restored by regrinding of the tool, (b) evidence of impending breakage, and (c) inability to machine to tolerances of size and finish for a given job design.

Preferably, the workpiece material is selected from the group consisting of a metal comprised of iron, steel or aluminum. Preferably, the holder is comprised of adjustable chucks, a cradle, first and second relatively movable members and resistance means; the resistance means is comprised of (i) coil compression springs which create an axial joint between the relatively movable members, and (ii) ball-cam which create a rotational joint between the members.

SUMMARY OF THE DRAWINGS

FIG. 6 is a schematic perspective view of the machining heads used in FIG. 5 and showing multiple spindles.

DETAILED DESCRIPTION AND BEST MODE

Figure 1:
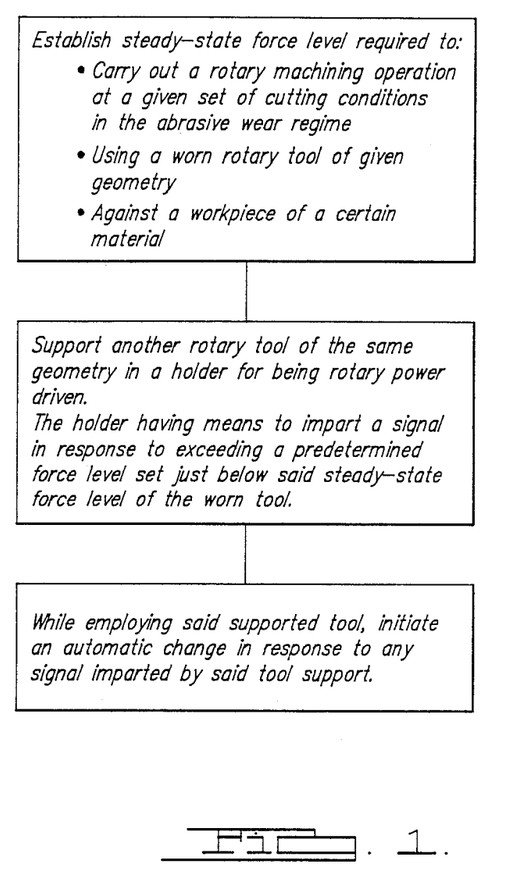
FIG. 1 is a schematic diagram of the method of this invention.

The method of this invention requires three essential steps (see FIG. 1):

(1) Establish a steady-state force level required to carry out a rotary machining operation at a given set of cutting conditions in the abrasive wear regime, using a worn rotary tool of given geometry, and against a workpiece of a certain material.

(2) Support another rotary tool of the same geometry in a holder for being rotary power driven, the holder having means to impart a signal in response to exceeding a predetermined force level set just below the steady-state force level of the worn tool.

(3) While employing the supported tool, initiate an automatic tool change in response to any signal imparted by the tool support.

ACCUMULATING WORN TOOL FORCE DATA

Basic to step (1), is the ability to sense thrust and torque which the rotary tool is experiencing. An accumulation of such thrust and torque data tells us that a rotary tool undergoes three stages of wear: the bread-in stage, followed by a relatively long and mild abrasive wear regime, which is culminated in a final stage comprising an abrupt transition to severe adhesive wear which results in catastrophic failure of the rotary tool. The progressive wear on the cutting edges during such wear stages is accompanied by changes in the thrust and torque forces which are generated by the drill operating at programmed speed and feed rates.

The ideal tool changing method would activate an automatic tool change when the cutting forces reach a level corresponding to the end of the abrasive wear state or useful life of the tool, but prior to any possibility for catastrophic failure of the tool. For purposes of this invention disclosure, a worn tool is one which is defined to have any one of the following conditions as selected by the tool operator: (a) excessive land wear beyond that which can be restored by regrinding of the tool; (b) evidence of impending breakage, and (c) inability to machine to tolerances of size and finish for a specific job application. It has been discovered as part of this invention that if a specific threshold of thrust or force for a specific rotary machining operation is selected at an informed level, all of these criteria for being worn will be avoided and the worn tool will be detected. As a result, tool costs and inventories will be minimized with improved efficiency of the tool regrind process and fewer defective parts.

Figure 2:
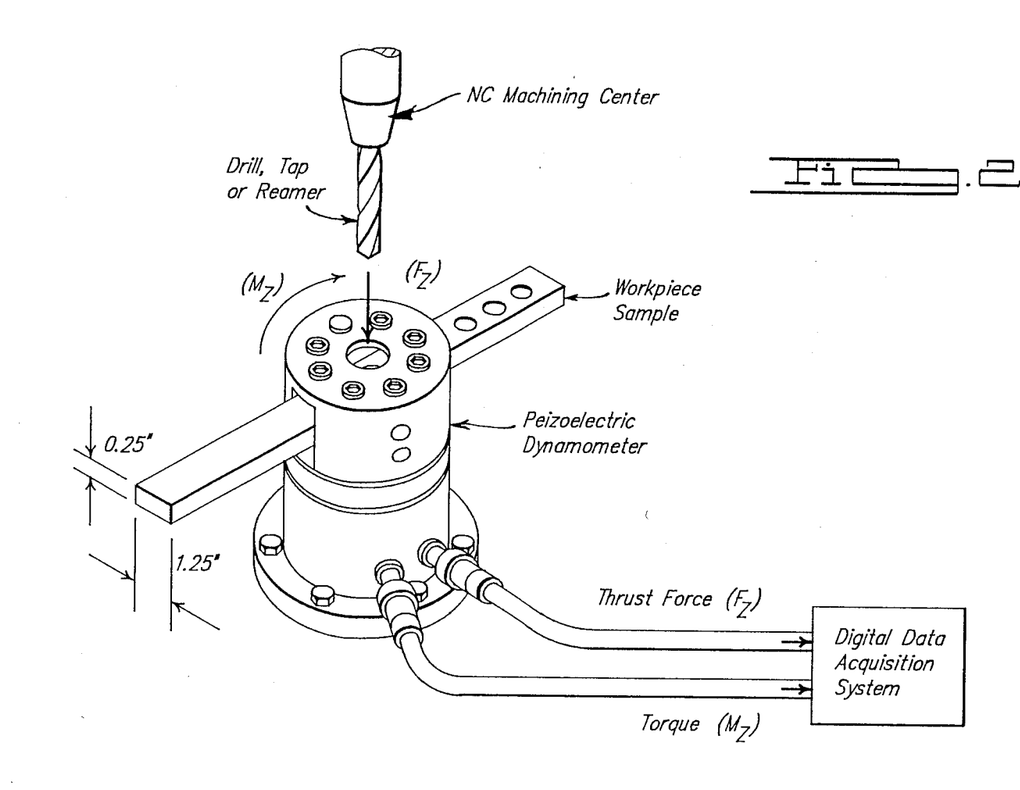
FIG. 2 is a perspective schematic view of an apparatus useful in measuring thrust and torque imposed on the workpiece, such apparatus being useful in collecting worn tool data.

The accumulation of steady-state force data is readily accomplished by use of a multicomponent piezo-electric dynamometer as that shown in FIG. 2; it senses the force through the workpiece. Such peizo-electric dynamometer may be constructed in accordance with the teachings in the disclosure of Gautschi, G. ("Cutting Forces in Machining and Their Routine Measurement with Multi-Component Peizo-electric Force Transducers", Proceedings of the 12th International Machine Tool Design and Research Conference, Manchester, Great Britain, September 1971). The disclsoure of Gautschi is incorporated herein by reference. In such disclosure, the torque and thrust forces are sensed at the workpiece and converted to electrical signals. The electrical signals are recorded, stored and analyzed and can be plotted using a digital data acquisition system. The tool forces can be measured for drills, taps, reamers or some small milling and boring tools.

As indicated, there are two force components of interest to this invention, namely, the thrust force which is an axial force component sometimes call the feed force, measured in pounds or Newtons, and torque which is measured in pound/inches (or in Newton/centimeters). Extensive wear on the chisel point 10 and cutting edges 11 (see FIG. 2) of the dull drill 11 will result predominantly in an increased thrust force, whereas the elimination of the margin 12 (see FIG. 2) of a drill will be expected to be reflected in higher drilling torque. The dynamometer 13 enables us to plot the force data (torque and thrust) so as to compare the sharp and worn out tools.

Figure 3:
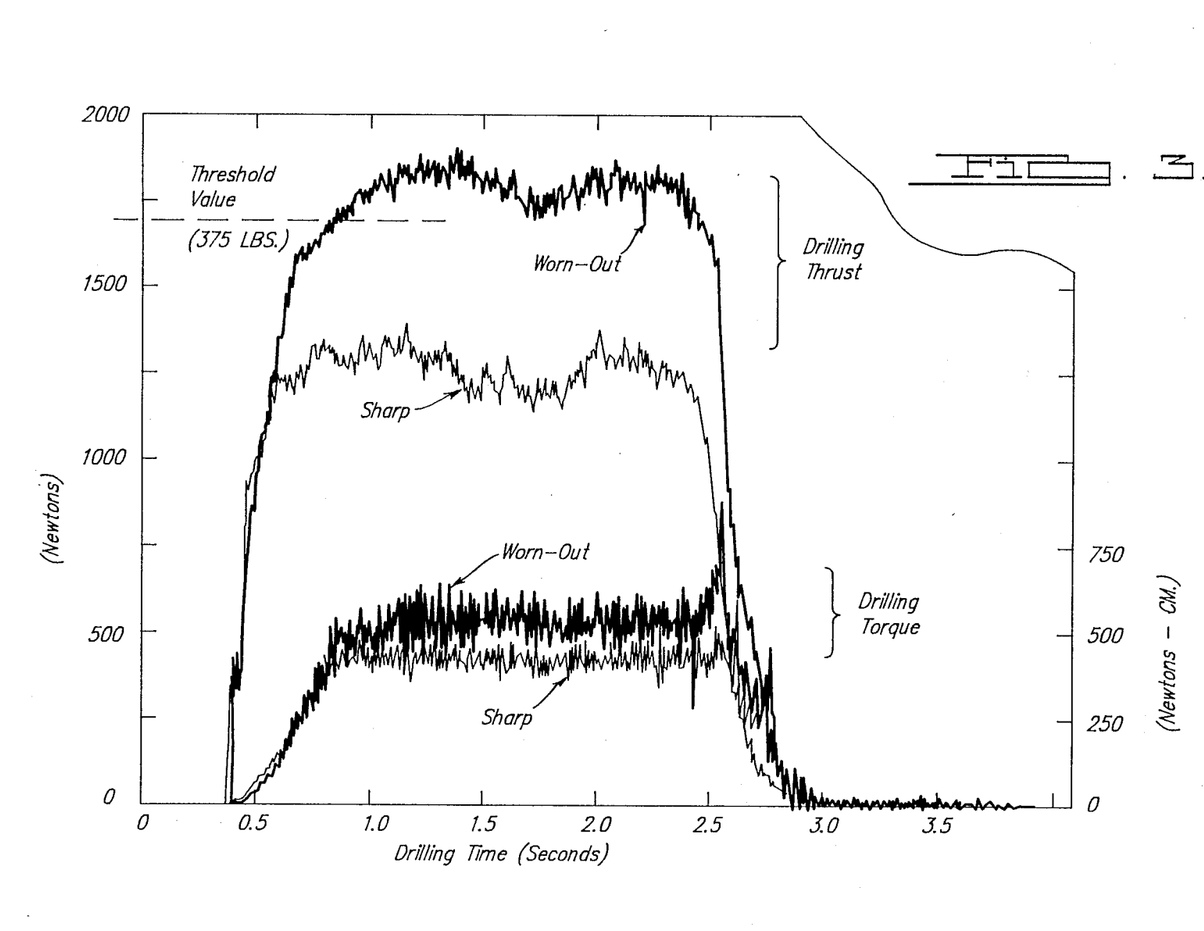
FIGS. 3 and 4 are graphical plots of time versus force signals received from a force sensitive tool holder during actual machining operations.

In FIG. 3, a composite graph on which the thrust and torque forces for both sharp and worn out drills is plotted. The data shows that a method set up to sense and respond to changes in the thrust force on the drill will work best. Relatively small differences in magnitude are seen in the torque forces for the sharp and worn drills. Thus, if one were to able to select a threshold value 14 that would discriminate between sharp and worn out thrust forces, it should be done in a drilling application rather than in a torque dominated operation. The spacing between the sharp and worn out values (as shown in FIG. 3) for torque of a drilling operation is difficult to separate.

Figure 4:
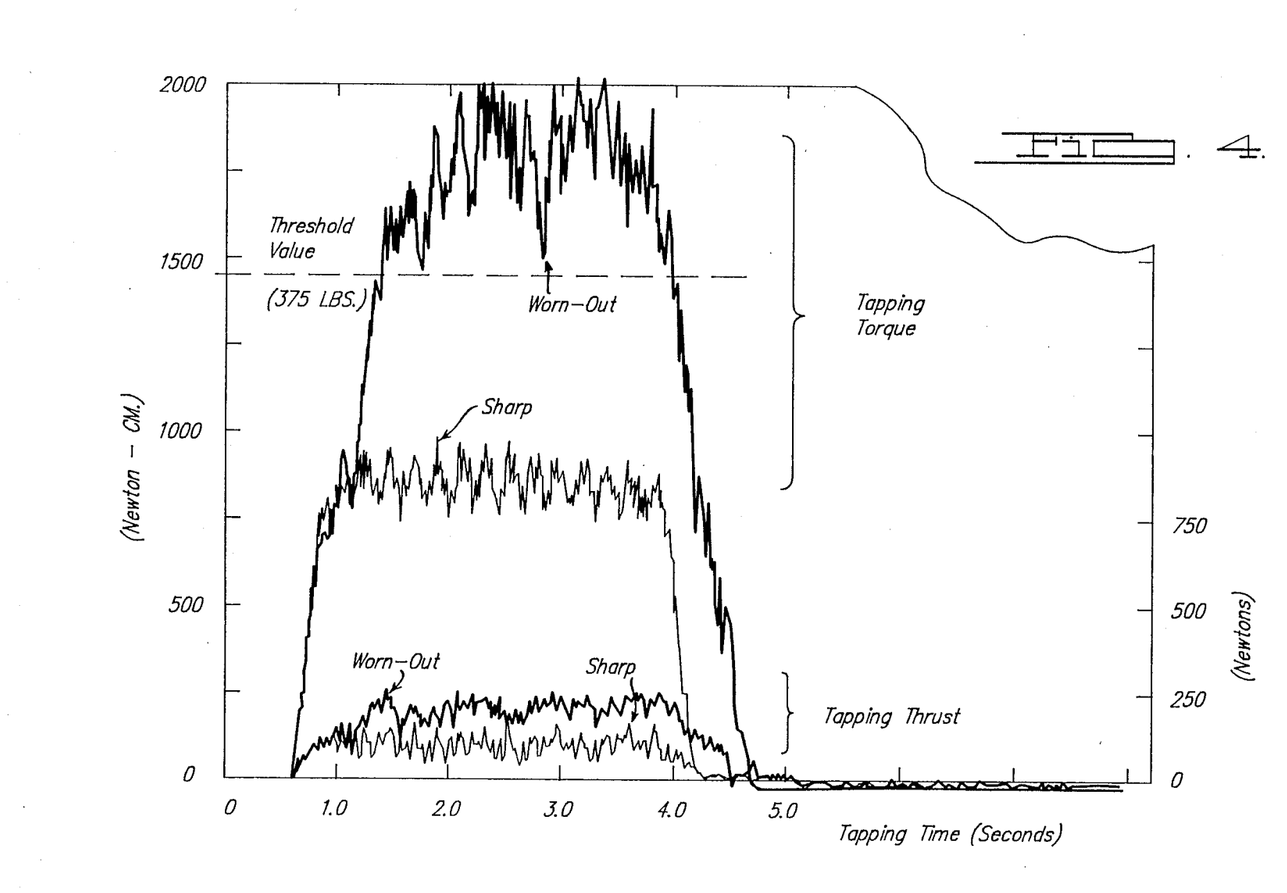

The data obtained in FIGS. 3 and 4 is typical of a large number of tests, mostly in cast iron but also in steel. Choosing a thrust value only for the threshold force level in a drilling application is a unique feature of this invention because: (a) the increase in thrust for a worn out drill is only about 50% compared to a sharp drill, (b) the thrust transients in the steady-state portion of the force curves are much smaller in magnitude, and (c) the force sensitivity of the tool holder can be precisely set to a single thrust force level for generating a signal of excessive wear.

Abnormally high torque conditions can occur unsuspectedly due to the presence of an impurity or other unforeseen element that would increase torque beyond its normal conditions, the tool holder should also be able to sense exceeding a predetermined torque level to detect impending fracture from unusual torque conditions. The use of a tool holder set up to respond to a thrust force threshold in drilling includes the simultaneous use of that tool holder as a sensor for worn out drilling torque. The combination of both a predetermined thrust and torque signals, in the same tool support, is a feature of this invention at strategized force levels.

FIG. 4 is a composite graph comparing the thrust and torque forces for tapping a single hole with a sharp tap and also with a worn out tap, under the same operating conditions. It is evident that the torque rather than the thrust is the better discriminating component for monitoring tool conditions in a tapping operation or similarly for reaming or other torque dominated operations. Selecting a torque threshold force value 15 between the sharp and worn data of FIG. 4 is easily facilitated. However, the response to a thread cutting thrust threshold can be used as a secondary level of detection against breakage such as would occur if the tap encountered an improperly drilled, undersized or nonexistent hole, performing like a probe station.

SUPPORTING IN FORCE-SENSITIVE TOOL HOLDER

Figure 5:
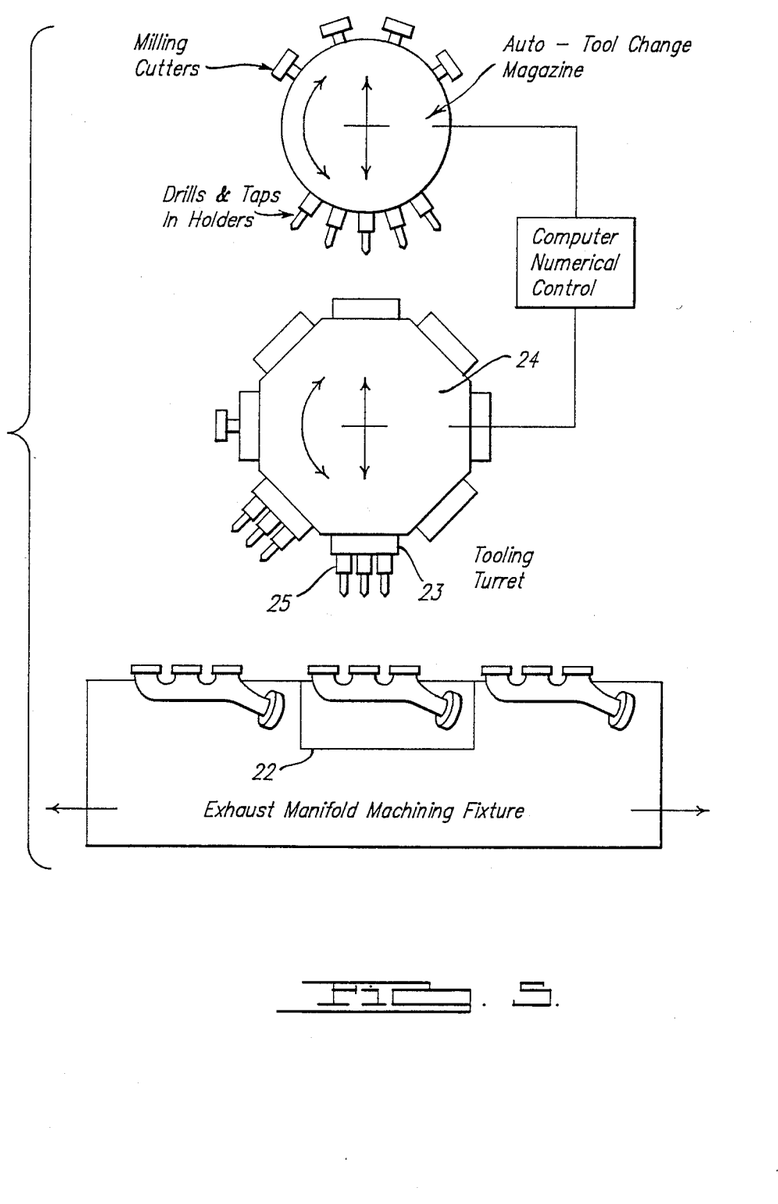
FIG. 5 is a schematic illustration of a machining system, including automatic tool changing, employing the present invention.

FIG. 5 shows a schematic illustration of a flexible machining cell 20 where a variety of machining operations, including surface milling, rotary drilling of various openings, as well as tapping threads in such openings, is all accomplished with a workpiece (here shown in the form of exhaust manifolds 21) held by a single clamp or fixture 22. The fixture or clamp is manipulated to facilitate the different required machining operations but is not transferred to a different station within the fabricating plant for other machining. The machining tools are carried in several multi-spindle machining heads 23. The heads in turn are carried on adjustable turrets 24. Each of the rotary tools are supported by a force-sensitive tool holder 25 with the tool holder in turn being carried in the adjustable head.

The force-sensitive tool holder 25 is a mechanical device (see FIG. 7) which can use preloaded springs 26 in combination with ball bearings 27 seated in rotary pockets 28 having accurate ramp angles to establish respectively threshold levels of force which are applied by the thrust and torque generated by the cutting tool. Such a mechanical device is disclosed in U.S. Pat. No. 4,507,025, the disclosure of which is incorporated herein by reference. The rotary tool 29 is held in an adjustable chuck 30 having a conical or tapered base 31 which is axially inserted into a receiving receptacle 32 having a shaft 33 which is adapted to be driven by a torque and thrust sensitive joint 34. The chuck 30 and base 32 are keyed together for conjoint rotation. The thrust and torque sensitive joint 34 is provided by use two relatively rotatable members 35 and 36 which have mating annular shoulders 37 and 38 between which are positioned the preloaded spring pack 26. Thus, force transmitted from the one member by way of the preloaded spring pack to the other member will be on a direct fixed joint basis, with no relative movement between the members, until such time as the reactive thrust received by the cutting tool is greater than the spring forces. The spring forces become the calibrated threshold thrust force for purposes of the present method.

Figure 7:
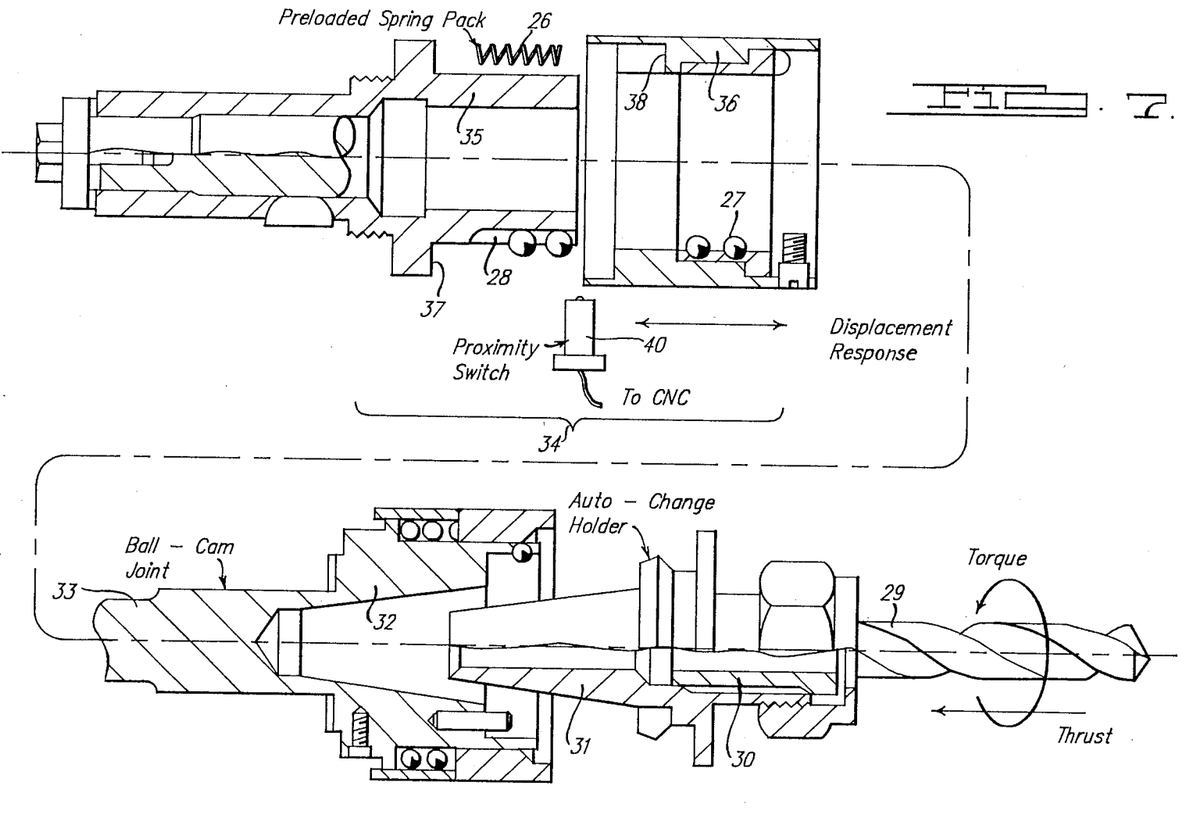
FIG. 7 is an exploded sectional view of one type of force sensitive tool holder that can be used in the inventive method.
Figure 11:
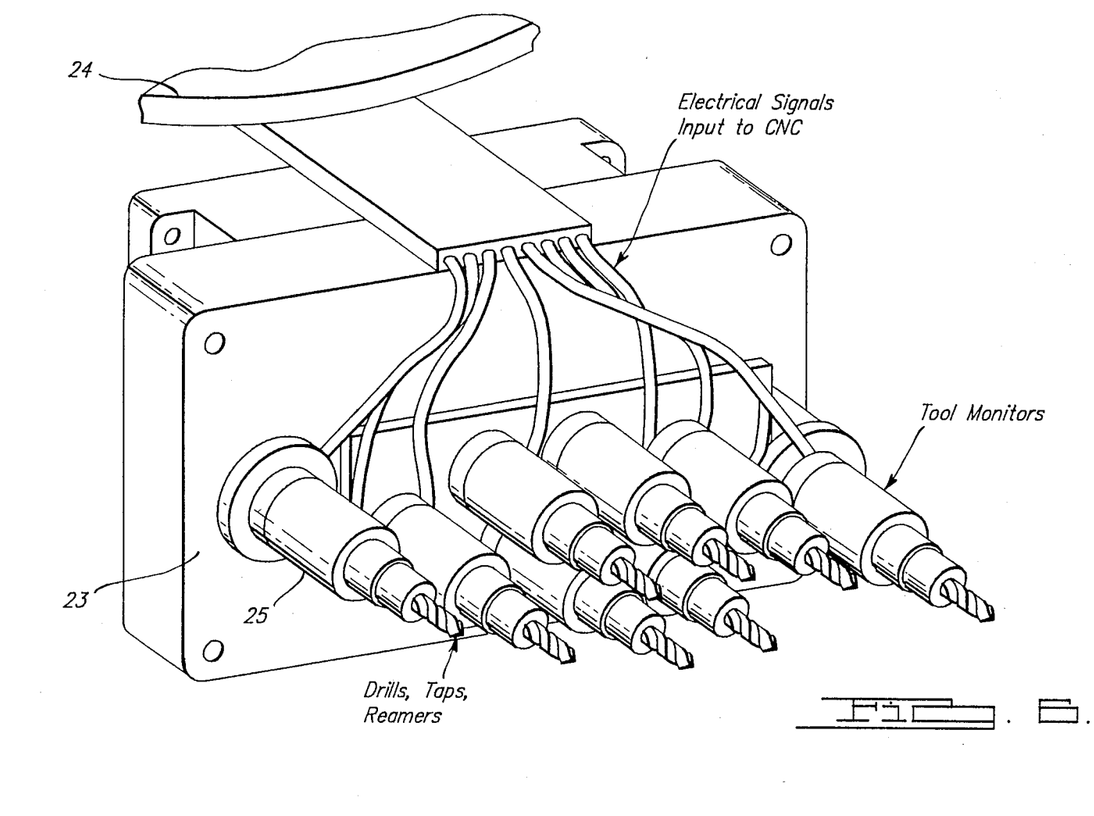

Simultaneouslsy, a torque responsive joint is created by use of balls 27 effective to be carried in cam grooves 38 placed on the nested cylindrical surfaces of each of the first and second members. Thus, when the members are nested together, the friction forces between the ball and ramps are sufficient to provide an inflexible transfer of torque therebetween. When the torque forces acting upon the rotary tool are in excess of the mechanical and friction forces, holding the two members together around the ball and cam joint, then the threshold level for torque is exceeded.

Whn either the thrust or torque threshold levels are exceeded, a relative movement will take place between the first and second members, and in each case will result in an axial movement of member 36; such movement will be in the direction of a proximity pickup switch 40 connected to computer aided numerical control for a tool changer (CNC). When the movement of the housing is sensed by the proximity switch, a circuit is closed generating a signal which is used to activate the automatic tool changer of FIG. 5.

The force-sensitive tool holder has several advantages: it does not impose major additional space requirements, and it produces a positive output when its presettable threshold is exceeded. The dual mechanical path design of such force-sensitive holder is significant; the response due to the applied torque is not affected by the applied thrust and vice-versa. The maximum displacement of the first and second members in an axial direction, for this embodiment, is about 0.02 inch. The gap between the collar and the proximity switch is typically set so as to switch the circuit at about one-half of maximum displacement. This setting serves to very accurately determine the independent levels of torque or thrust that would signal a worn out tool.

Table I contains typical data for thrust and torque combinations that may be encountered as a function of the number of a particular type of spring and ramp angle of the ball bearing pockets. These guidelines show how the force levels for the force-sensitive holder for torque and axial force are interrelated. Once the primary force threshold, either for thrust or torque, has been selected, the possible choices for the secondary force threshold are very limited. As an example, with six springs and a ramp angle of 105°, Table I shows that the force-sensitive holder would detect an axial force of 255 pounds or a torque of 210 inch/lbs.

PROCESS VARIABLES LIMITING METHOD

Certain variables will have an effect upon the cutting forces. These variables include machine condition, feed rate, speed, workpiece material, tool material, tool geometry, and cutting fluids employed. The process variables should be duplicated between steps (a) and (b) if the threshold levels are to be carried out with predictability.

The effects of hardness of the workpiece on the forces in drilling and on tapping torque will be to increase the forces in proportion to the increase in hardness with only minor deviations. The thrust forces in drilling is expected to be dependent upon the deformation and flow resistance of the metal extrusion around the cutting edges and chisel point and this is indicated in proportionality to the material's hardness or resistance to penetration. With respect to torque, the variability with hardness is more complex. The interaction of the cutting tool with the microstructural features of the workpiece material in the shear zone during chip formation has the greatest importance. There is a wide scatter in data attributed to differences in composition and microstructure among workpieces.

Certain less common workpiece materials would be entirely unsuitable for the present method. For example, fiberglass reinforced plastic which is drilled in a direction perpendicular to the plane of unit directional fibers. The lack of homogeneity in isotropy of this kind of composite, as well as other material characteristics, make the measurement of cutting forces very different from typical metals.

Drills and taps have different point and cutting edge configurations. It is known that drilling forces are affected by the cone angle, chisel length and angle, cutting edge curvatures, relief angles, web thickness, flute angle, and flute shape. To employ the method of this invention, it is important that the tool geometries remain consistent between steps (a) and (b).

In summary, an improved method of determining worn rotary tools during machining operations has been developed. It has also been shown how to implement such method to accommodate drilling and tapping machine operations in a high production machining of components for the automotive industry. A single worn or broken tool is detected in a multiple-spindle array, resulting in a computer control replacement of that tool and automatic reinstatement of the machining cycle. The method employs a force-sensitive tool holding mechanism which is predicated on the dependence of cutting force components upon tool wear. The force-sensitive holder consists of a mechanical mechanism built in to the supporting head for the cutting tools. The force-sensitive holder is adjustable to threshold limit values of either the force-feed or the cutting torque, depending on the process to be controlled. An electrical pulse is created to signal a defective tool in response to exceeding the threshold levels or limits of either said feeding force or cutting torque. The method primarily tracks the wear life of tools with cutting time, but the system also provides detection of impending tool fracture.

While several embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

TABLE I

| No. Of Springs | | THRESHOLD VALUES OF RESPONSE Ball Seat Angle (Degrees) | | | |
|---|---|---|---|---|---|
| | | 90 | 105 | 120 | 135 |
| 2 | Torque | 80 | 58 | 45 | 21 |
| | Thrust | 85 | 85 | 85 | 85 |
| 6 | Torque | 260 | 210 | 152 | 94 |
| | Thrust | 255 | 255 | 255 | 255 |
| 10 | Torque | 435 | 350 | 250 | 150 |
| | Thrust | 420 | 420 | 420 | 420 |
| 14 | Torque | 605 | 525 | 355 | 220 |
| | Thrust | 590 | 590 | 590 | 590 |
| 18 | Torque | 825 | 625 | 495 | 355 |
| | Thrust | 760 | 760 | 760 | 760 |
| 22 | Torque | 945 | 750 | 550 | 405 |
| | Thrust | 930 | 930 | 930 | 930 |

TORQUE - POUND INCHES; THRUST - POUNDS
SPRING SPEC.: .055 IN. WIRE; 10 COILS/IN.; 42 POUND PRELOAD

We claim:

1. A method of determining worn rotary tools during machining operations, comprising:
    (a) establishing the steady-state dominant tool force level required to (i) carry out a rotary machining operation at a given set of cutting conditions in the abrasive wear regime, (ii) using a known worn rotary tool with a given geometry, and (iii) using a workpiece of given material;
    (b) supporting another rotary tool of the same given geometry in a holder for being power driven for rotation, said holder having means to impart a signal in resonse to exceeding a predetermined force level calibrated to be just below the steady-state force level of the worn tool; and
    (c) while employing said another tool to rotary machine a workpiece of the same given material, initiating an automatic tool change in response to a signal imparted by said means of said holder for said another tool.

2. The method as in claim 1, in which said machining operation is drilling and the force level of steps (a) and (b) uses the thrust force component applied axially to the rotary tool.

3. The method as in claim 1, in which said machining operation is tapping, a predominantly torque responsive operation, and in which said force level of steps (a) and (b) uses the torque force component.

4. The method as in claim 1, in which the cutting conditions of step (a) are comprised of feed and rotary speed.

5. The method as in claim 1, in which the known rotary tool of step (a) has at least one of (i) excessive land wear beyond that which can be restored by regrinding of the tool, (ii) evidence of impending breakage, and (iii) inability to machine to the tolerances of size and finish for a specific job application.

6. The method as in claim 1, in which said holder has relatively movable members and has resistance means for preventing relative movement between said members until a force level experienced by the machining operation exceeds the resistance of said means, the resistance means being calibrated to be overcome at a force level just below the steady-state tool force level established in step (a) for the worn tool.

7. The method as in claim 6, in which said holder is comprised of an adjustable chuck, nestable axially into one of said relatively rotatable members, the rotatable members having a coiled spring pack extending therebetween in an axial direction thereof to establish the thrust force threshold and has a plurality of balls confronting ramps in cylindrical surfaces of said members to establish the torque threshold between said members.

8. The method as in claim 1, in which said workpiece is comprised of a material selected from the group consisting of iron, steel, and aluminum.

9. The method as in claim 1, in which the signal of step (c) is generated by use of a proximity switch.

10. A method of monitoring the cutting condition of a rotary cutting tool, comprising:
    (a) establishing the steady-state level of force experienced to carry out rotary machining at a given set of cutting conditions in the abrasive wear regime for a worn tool of given geometry and a workpiece of given material, said force being thrust and/or torque;
    (b) while rotary machining a workpiece of the same material with another rotary tool of like geometry sensing the steady-state level of the same force; and
    (c) determining when said sensed level of force exceeds a predetermined threshold for the same force calibrated to be immediately below the steady-state level of said worn tool and thereby deeming such another tool as worn.

11. The method as in claim 10, in which said machining operation of steps (a) and (b) is drilling, and said established and sensed levels of force are thrust.

12. The method as in claim 10, in which said machining operations of steps (a) and (b) is tapping, and said established and sensed levels of force are torque.

* * * * *